Oct. 17, 1950     A. E. YOUNG     2,526,058
SLACK-ELIMINATING MECHANISM FOR TRACTION POWER LIFTS
Filed Sept. 27, 1948
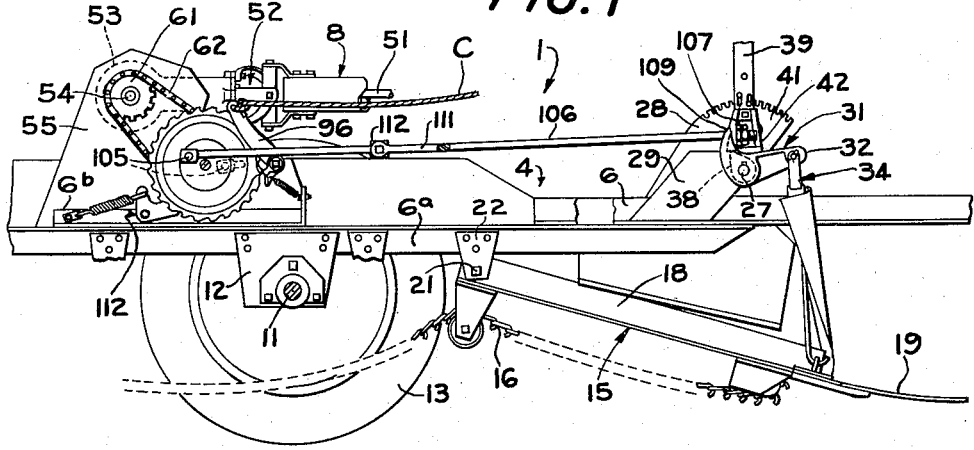
INVENTOR.
AUSTIN E. YOUNG
ATTORNEYS Patented Oct. 17, 1950

2,526,058

UNITED STATES PATENT OFFICE 2,526,058

SLACK-ELIMINATING MECHANISM FOR TRACTION POWER LIFTS

Austin E. Young, Syracuse, N. Y., assignor to Syracuse Chilled Plow Co., Inc., Syracuse, N. Y., a corporation of New York Application September 27, 1948, Serial No. 51,472

3 Claims. (Cl. 55—51)

1

The present invention relates generally to agricultural implements, such as potato diggers and the like but is not limited to such machines, and is more particularly concerned with new and improved lifting mechanism for raising and lowering the operating unit, such as a potato digger shovel, into and out of transport and ground engaging positions.

The object and general nature of the present invention is the provision of lifting means in which the connections with the tool or unit to be raised are maintained taut and all slack removed therefrom whereby, when the power unit is operated to raise the shovel unit into its raised position, there is no lost motion and a full lift cycle is attained without requiring excessive overtravel or the like of the operating means. More specifically, it is a feature of this invention to provide means associated with a planetary type power lift unit and acting against one of the driven members of the planetary power lift unit for maintaining the lifting connections taut at all times that the implement operating unit is in working position. Specifically, a feature of this invention is the provision of a friction brake arrangement cooperating with the power lift unit and constructed and arranged to cause all lifting connections to be held in a position for immediate action when the lifting cycle is initiated.

These and other objects and advantages of the present invention will be apparent to those skilled in the art after a consideration of the following description and the accompanying drawings disclosing and illustrating the preferred form of the present invention.

In the drawings:

Figure 1 is a side view of a potato digger in which the principles of the present invention have been incorporated.

Figure 2 is an enlarged fragmentary side view of certain parts of the power lift mechanism.

Figure 3 is a sectional view taken generally along the line 3—3 of Figure 2.

Referring now particularly to Figure 1, for the purpose of illustrating the principles of the present invention, I have shown portions of a two-row potato digger of the type shown in my prior United States Patent 2,417,580, issued March 18, 1947. The two-row potato digger chosen to illustrate the principles of the present invention comprises two substantially complete implements, the left hand implement being indicated in Figure 1 by the reference numeral 1, the right hand implement being substantially identical thereto. Each implement includes a frame 4 which comprises generally fore and aft extending frame bars in the form of angles 6, the front ends of which are supported by any suitable means, as by a front truck (not shown) or on the drawbar or other part of a propelling tractor. The tractor (not shown) may be of the usual construction and includes a conventional power take-off shaft which is connected to drive the driven parts of the digger by a drive shaft 8, the latter being carried by the left hand implement 1 and connected through suitable jackshaft connections to drive the parts of both left and right hand implements, as will be referred to later in detail. The rear end of each of the implement frames 4 is supported on a transverse axle 11, as by suitable brackets 12, the axle 11 extending from one side to the other of the two interconnected implements. A ground wheel 13 is carried at each end of the axle 11, and the ground wheels, together with the front supporting means, support the machine during transport and in operation. The brackets 12 are connected to the frame angles 6 and the axle 11 by any suitable means and may be arranged to provide for lateral adjustment whereby the two implements 4 may be adjusted for different row spacings, if desired.

Each potato digger unit or implement 1 comprises, in addition to the parts mentioned above, a tool or shovel unit 15 connected to the forward end of the frame 4, an elevator chain 16 of the usual rod or link construction, and suitable driving means (not shown) for the chains 16. Each shovel unit 15 comprises a frame made up of a pair of angle members 18 to the lower ends of which a pointed shovel 19 is connected in any suitable manner. The rear ends of the angle members 18, which serve as arms supporting the associated shovel 19, are pivotally connected at 21 to brackets 22 fixed to the associated frame angles 6a which are interconnected with and serve as extensions of the above-mentioned frame angles 6. The forward portion of the chain 16 is supported on the vertical shiftable frame angles 18, and each shovel unit 15 is raised and lowered by means mounted on the forward end of the associated frame. Preferably, such means includes a transverse rockshaft 27 journaled in a pair of brackets 28 and 29 fixed by bolts 30 to the associated frame angles 6. Fixed to each end of each of the rockshafts 27 is a lifting arm or bell crank 31 having a forwardly extending arm section 32 that is connected by means of adjustable link means 34 with the forward end of the associated shovel frame angle 18. Thus, counterclockwise movement of the shaft 27 and arms 31 acts through the links 34 to raise the forward end of the shovel unit 15 out of its lowered or operating position into a transport position and vice versa.

A manually adjustable stop 38 is fixed to each lifting rockshaft 27 adjacent the bracket 28, and pivotally mounted on each shaft 27 is a hand lever 39 having the usual detent mechanism adapted to latch the hand lever 39 to a sector 41 formed on or carried by the associated bracket 28. The hand lever 39 includes an abutment or stop member 42 with which the outer end of the stop arm 38 is adapted to engage. Moving the hand levers 39 to various positions permits the associated shovel units 15 to move to various lowered or operating positions, but when the bell cranks 31 are swung in a counterclockwise direction, which is done by power lift means described below, the shovel units 15 are raised into their transport or non-working position.

Power for driving the two elevator or potato chains 16 is derived from the tractor power take-off shaft which, as mentioned above, is connected to drive the drive shaft means 8. The latter unit comprises a rear power shaft section 51 connected through suitable universal joint means 52 and bevel gear unit 53 to a transverse drive shaft 54 which is supported by suitable bearings in a pair of vertically extending brackets 55 carried by the frame 4. The corresponding transverse drive shaft of the companion unit is driven from the drive shaft 54 through suitable universal joint and extension shaft means (not shown).

According to the principles of the present invention, power is taken from the jackshaft or transverse shaft 54 of the left hand implement 4 to drive a self-interrupting clutch mechanism which, in turn, is connected to raise and lower the several units of both implements without slack in the connections or delay in the actual upward movement of the shovel units. A sprocket 61 is fixed to the inner end of the shaft 54 and receives a drive chain 62 which at its lower end is trained around a driving sprocket 63, which serves as the driving member of a self-interrupting clutch unit indicated in its entirety by the reference numeral 64. The sprocket 63 is continuously driven from the jackshaft 54 during all times that the outfit is in operation.

Referring now to Figure 3, a power lift support plate 67 is mounted in any suitable manner on the inside frame angle 6a and receives a bolt 68 by which a stationary bushing 73 is firmly secured in place. The drive sprocket 63 is journaled for rotation on the bushing 73 and is provided with a hub section in the outer end of which a sun gear 74 is carried. The sun gear 74 meshes with the larger gear sections 76 of a pair of planet gears 77 mounted for rotation on a rotatable housing member 78. Meshing with the inner or smaller gear sections 81 of the planet gears 77 is a ring gear 82, which constitutes the second driven member of the clutch unit 64. The ring gear 82 is journaled for rotation on the outer end of the bushing 73, being held in place by the head of the bolt 68. As will be readily understood, either of the members 78 and 82, if held against rotation, will serve as the reaction member by which the other is driven.

The rotatable member 78 is formed peripherally with a plurality of notches 86, and adjacent thereto the peripheral portion of the driven member 78 is formed as a drum-like section 87, preferably cylindrical. The notched or scalloped section is disposed closely adjacent a flange 89 formed on the other rotatable driven member 82. The flange 89 is provided with a stop lug or cam 92 and, circumferentially spaced therefrom, a trip lug or cam 93. The lugs 92 and 93 cooperate with a trip or control lever 96 which is mounted for rocking movement on a stud 97 fixed in any suitable manner to the supporting plate 67. The trip lever 96 includes or carries a lug 98 which lies in the plane of the flange 89 on the rotatable member 82. The trip lever 96 carries a second lug 99 which is disposed in a position to engage any one of the notches or scallops 86 formed in the flange of the rotatable driven member 78. The lugs 98 and 99 are arranged so that only one may be engaged at any one time with the associated lugs 92, 93 and notches 86. A spring 101 is connected between the bracket 67 and the trip lever 96 and biases the latter for movement into a position carrying the lug 98 into engagement with the flange 89. The parts are arranged so that, when the shovel 19 is lifted, the lug 98 engages the lug 92 and so locks the member 82 against rotation, at least in a clockwise direction, as viewed in Figure 2.

The driven member 82 carries a crank pin 105 which receives the rear end of a lifting link 106, the forward end of which is threaded to receive a pair of lock washers 107 and an associated abutment member which seats in a socket formed in the outer end of the arm 109 of the lifting bell crank 31, as best shown in Figure 1. A companion link 111 (Figure 1) is connected by a set screw collar 112 to the link 106. The link 111 extends to the lifting mechanism of the right hand implement, such lifting mechanism including bell cranks and linkages corresponding to the members 31 and 34 described above. Thus, operation of the one power lift unit 64 serves to raise and lower the several units of both implements. When the shovel units are raised, the crank pin 105 is swung into a rearward overcenter position (as shown in Figure 1) but when the shovel units are lowered the crank pin 105 occupies a forward position, substantially like that shown in dotted lines in Figure 1. The shovel units may be lowered to different positions, depending upon the adjustment of the stop members 42 and hence when the implements are in operation the trip lever lug 98 occupies a position against the flange 89 of the member 82. When it is desired to raise the shovel units the operator exerts a pull on a cable C connected to the outer end of the trip lever 96 and exerts a pull thereon sufficient to cause the lug 99 to enter one of the notches 86. This terminates the rotation of the member 78 and diverts or causes the power to be transmitted from the continuously rotating driving member 63 to the driven member 82, which is the part carrying the crank pin 105. Therefore, as long as the operator holds the trip lever 96 in its forward position, the member 78 is held against rotation and the member 82 is caused to rotate in a clockwise direction, as viewed in Figures 1 and 2. Rotation of the member 82 continues until the lug 93 engages the lug 98 on the trip lever 96. This lug 93 engages the lug 99 and forces the trip lever 96, if it has not been previously released by the operator, into a released position, moving the lug 99 which extends across both members 82 and 78, into a position releasing the member 78, whereupon further rotation of the member 82 terminates. However, the member 78 then rotates idly.

Use is made of the above-mentioned idle rotation of the driven member 78 for maintaining the connections between the power lift driven member 82 and the two shovel units taut, thereby eliminating all slack in the connecting linkages. As best shown in Figure 1, there are several joints and operating parts between the member 82 and the lower or forward ends of the shovel units, and normally some slack or lost motion may be present whereby, without some means for eliminating this slack or lost motion, a considerable portion of the operating cycle or lifting cycle of the member 82 may be wasted, so far as lifting effort is concerned, by the act of taking up the slack in the connections. In order to provide means for taking up this slack or lost motion, I have provided the means which will now be described.

A bell crank 112 is mounted on a stud 113 carried by an auxiliary angle 6b on the frame angle 6a. One arm 114 of the bell crank 112 is notched to receive one end of a spring 115, the other end of which is connected by a clip 117 and a bolt 118 to the frame angle 6a. The other arm 119 of the bell crank 112 has a laterally disposed arcuate extension 121 faced with suitable friction material 122, such as conventional brake lining or the like. The bell crank 112 is mounted in such a position and is so constructed and arranged that the friction surface 122 is disposed in the plane of the drum section 87 of the member 78, and the spring 115 exerts a continual bias urging the friction face 122 into engagement with the outer surface of the drum or cylindrical section 87.

The effect of the bell crank 112 and associated parts is to impose a continual drag or resistance to rotation of the member 78. This member, as described above, normally rotates idly when the other driven member 82 is held against rotation, either by the lug 98 on the trip lever 96 engaging the lug 92 when the shovels are raised, as in Figure 1, or by the weight of the shovel units acting through the link 106 and crank pin 105 against the member 82, when the shovels are lowered, which brings the crank pin 105 to its forward position (dotted lines, Figure 1). However, due to the drag or resistance imposed by the bell crank 112 on the member 78, there is a continual drag tending to cause rotation of the member 82 in a clockwise direction, as viewed in Figures 1 and 2. The effect, therefore, is for this limited rotation of the member 82 to take up all slack or lost motion in the lifting linkage extending entirely from the member 82 to the forward ends of the shovel units. Thus, whenever the trip lever 96 is actuated to stop all the idle rotation of the member 78, the resulting diversion of power through the member 82 causes the latter substantially immediately to begin raising the shovels toward their raised or inoperative position. In this way the shovels lift immediately when the trip lever 96 is actuated and substantially the full lifting cycle of the member 82 is available to raise the shovel units 15.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural machine including a support, an operating unit movable relative to the support from one position to another and normally biased for movement toward one position, and linkage connected with said unit and movable in one direction for shifting the latter against said bias toward said other position, the combination of power lift means for operating said linkage, comprising a constantly rotatable driving member, a pair of driven members, planetary gearing connecting said driven members with said driving member whereby the rotation of the latter serves to drive either of said driven members when the other is held against movement, means for connecting one of said driven members with said linkage to actuate the latter, and means for releasably engaging the other driven member for controlling the transmission of power to said one driven element so as to cause the latter to shift said linkage in said one direction, and brake means acting against said other driven member when the latter is released for movement for imposing a drag thereon so as to cause said one driven member to be moved to take up the slack in said linkage and connections thereof with said one driven member and said operating unit, whereby the latter is shifted against said bias substantially immediately after said releasable means engages said other driven member.

2. The invention set forth in claim 1, further characterized by said brake means comprising a part movably mounted on said support and frictionally engaging said other driven member, and biasing means acting against said movably mounted part for continually pressing the latter into engagement with said other driven member.

3. The invention set forth in claim 1, further characterized by said brake means comprising a bell crank pivotally mounted on said support, friction means carried by one arm of said bell crank and engagable with the periphery of said other driven member for imposing a drag thereon, and spring means acting against the other arm of said bell crank for pressing said friction means against the periphery of said other driven member.

AUSTIN E. YOUNG.

REFERENCES CITED

The following references are of record in the file of this patent:

UNITED STATES PATENTS

| Number | Name | Date |
| --- | --- | --- |
| 1,791,742 | Osgood | Feb. 10, 1931 |
| 2,246,673 | Glasner | June 24, 1941 |
| 2,261,382 | Jimerson | Nov. 4, 1941 |
| 2,417,580 | Young | Mar. 18, 1947 |
| 2,418,267 | Lawler | Apr. 1, 1947 |
| 2,444,448 | Kannenberg | July 6, 1948 |